March 8, 1949.  G. W. CARPENTER  2,464,022
ELECTRICAL UNIT CLOSURE
Filed June 15, 1945

INVENTOR.
Glenn W. Carpenter
BY Chester F. Carlson
ATTORNEY

Patented Mar. 8, 1949

2,464,022

UNITED STATES PATENT OFFICE 2,464,022

ELECTRICAL UNIT CLOSURE

Glenn W. Carpenter, Indianapolis, Ind., assignor to P. R. Mallory & Co., Inc., Indianapolis, Ind., a corporation of Delaware Application June 15, 1945, Serial No. 599,656

3 Claims. (Cl. 174—77)

This invention relates to container closures and has particular reference to means for closing electrical unit housings.

An object of this invention is to provide improved means for retaining closure members in assembly with electrical unit housings.

Other objects will be apparent from the following specifications and claims, and the accompanying drawings, in which:

This invention may be used with electrical unit containers or housings in a variety of materials, shapes and forms; the particular example herein described as an illustration is an electrolytic condenser in a cylindrical housing of molded Bakelite having one end integrally closed and the other end closed by a cover which is secured to the housing in accordance with this invention.

The electrolytic condenser unit embodying this invention comprises the Bakelite housing, in which the customary roll of condenser foils is contained, a cover for the housing, and a device for securing the cover to the housing.

Figure 1:
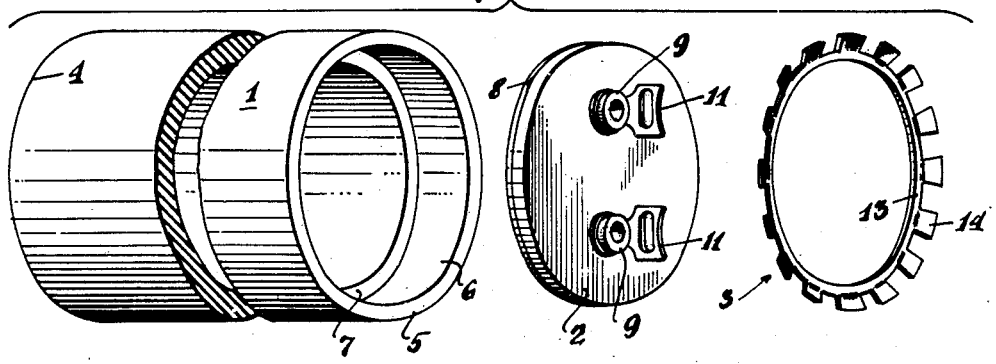
Figure 1 is an exploded view in perspective of an electrolytic condenser housing assembly, illustrative of this invention.
Figure 2:
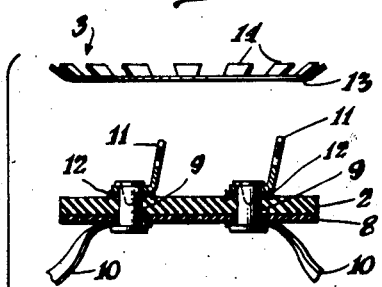
Figure 2 is a partial view, also exploded, in central section of the assembly of Figure 1.

As illustrated in Figure 1, the Bakelite housing is indicated by the number 1, the cover by 2, and the cover securing device, or ring, by 3. The condenser foil roll is not shown since the invention relates to the housing and its closure, rather than its contents.

The housing 1 is preferably formed by molding a suitable synthetic insulating resin but any other desired method of forming or other suitable materials such as a plastic or metal may be used. A suitable shape for the housing 1 is as a circular cross-sectional cylinder but it is within the scope of this invention that the housing cross-section may be of any desired curved or straight sided shape, such as square, for example.

The housing 1 is formed with an integral base at one end 4 and has its other end open with an annular end face 5. The inner wall of the housing is stepped so that the housing wall adjacent the housing open end has a uniformly reduced thickness with respect to the rest of the housing wall, and so that an unbroken smooth inner surface 6 is provided adjacent the open end of the housing, leading to an inner annular shoulder 7 of sufficient width to provide a substantial seat for the cover 2.

The shoulder 7 faces the open end of the housing 1 in substantial parallelism with the housing end face 5. The shoulder surface may however be at any desired angle with respect to the housing or the housing end face 5.

The cover 2 is formed to lateral dimension and contour as defined by the inner housing wall 6 so that the cover may be inserted in the open end of the housing 1 to rest on the shoulder 7 and to be in snug fitting relation with the inner housing wall 6. The thickness dimension of the cover 2, and the distance of the shoulder 7 from the housing end surface 5 are arranged so that the cover 2 may rest on the shoulder 7 with the outer surface of the cover a substantial distance inside the housing 1.

The cover 2 comprises a disc of a synthetic insulating resin material or of similarly suitable non-conductive material, and has a disc 8 of sheet rubber or the like, of the same diameter as the disc 2 but of less thickness, strongly secured by cementing or other suitable means to its inner face so that in assembly the rubber sheet 8 has an annular peripheral portion of its free face in engagement with the housing ledge 7. Also, in assembly, the cover 2 is under pressure from the securing ring 3, against the housing shoulder 7, and the rubber sheet 8 is compressed so that its periphery, which in disassembly is coincident with that of the cover disc 2, is forced radially outwardly into the angle formed by the junction of the inner housing wall 6 and the shoulder 7, thus providing a very efficient closure seal which prevents the entrance of impurities into the condenser housing and the escape of electrolyte or gases from the condenser housing.

Connection is made from the condenser foil plates to the outside of the condenser housing through two aluminum pins 9 which extend through the cover 2 and the rubber disc 8. The pins 9 are preferably located on a diameter of the cover 2, each substantially equidistant from the cover periphery and its center. The inner end of each pin 9 extends through and is headed over a ribbon-like condenser foil connecting strip 10 also formed of aluminum and the outer end of each pin 9 extends through and is headed over a connection terminal angle bracket 11 of tinned brass or steel and a steel lock washer 12. The heading over of the pins 9 both expands the pins radially and compresses the cover 2 and the rubber disc 8 inwardly against the pins to efficiently seal the cover and rubber disc openings through which the pins 9 extend. The connection terminal angle brackets 11 each have a flat upstanding portion which extends somewhat beyond the end face 5 of the condenser housing 1 when the housing and the cover 2 are in assembly. An opening is provided in each of the upstanding portions of the terminal brackets 11 for the reception of an outside connection wire to be soldered or otherwise secured to the terminal bracket.

The pins 9 and the connection strips 10 are formed of aluminum since the condenser foil is normally aluminum. Electrolytic action between two dissimilar metals within the housing is thus avoided.

The cover securing ring 3 is preferably formed of resilient metal such as spring steel. In the assembly of the condenser unit, the cover 2 is first placed in the open end of the housing 1, against the shoulder 7, and the securing ring 3 is then forced into the open end of the housing 1, against the cover 2, to compress the rubber disc 8 in forming a seal between the cover 2 and housing 1 as has been described herein. The peripheral edge portions of the securing ring 3 resiliently engage the inner wall 6 of the housing 1 to strongly hold the ring 3 against the cover 2 in securing the cover 2 to the housing 1 and in maintaining the seal provided between the rubber disc and the inner housing faces comprising the shoulder 7 and the wall 6.

The securing ring 3 is in the general shape of a frustum of a cone, and is assembled in the open end of the condenser housing 1 with the frustum top engaging the cover 2 and with the normal or true base of the cone facing outward and located within the housing in spaced relation with the housing end surface 5. The preferred form of securing ring is shown in Figures 1, 2, 3, and 5 and comprises an annular substantially flat portion 13 defining the top of the frustum and having, at regularly spaced points on its periphery, substantially flat teeth 14 all extending from the annular portion 13 in similar outwardly angular and directional relationship with the annular portion 13 to effectively define the side surface of the frustum with their outer faces and the base of the frustum with their ends.

Figure 3:
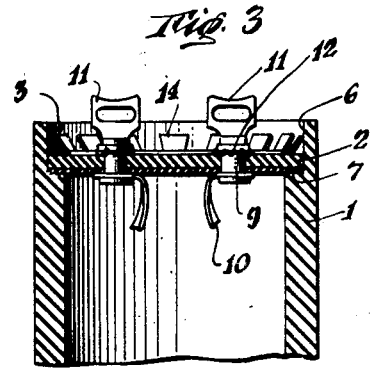
Figure 3 is a partial view, in central section, of the assembly of Figures 1 and 2, with the housing, cover, and seating ring in assembled relation with each other.
Figure 3:
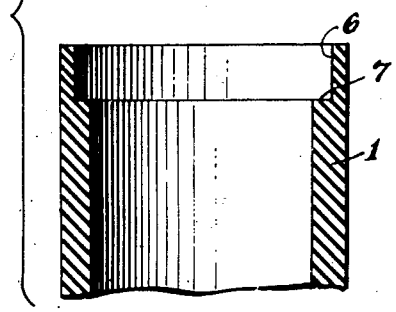

The securing ring 3 may be formed by drawing a shallow cup from sheet stock, and forming an annular spring steel portion 13 with spaced peripheral teeth 14, and thereafter bending the teeth to the desired angle with respect to the annular portion 13. The surface junction of the outer and inner faces of the teeth 14 with the annular portion 13 may be rounded or angular as desired. The diameter of the ring including the teeth must be sufficient as blanked out to permit bending of the teeth to the desired angle without reducing the overall diameter to the diameter defined by the inner wall 6 of housing 1. The center of the ring is removed to prevent interference with the connection pins 9 and terminal brackets 11. Before the spring ring 3 is assembled in the housing 1 the ring overall diameter is greater than that defined by the housing wall 6. In assembly, the ring teeth 14 engage the wall 6 and are bent inwardly. This engagement is preferably, as shown in Figure 3, between the radially outermost edges of the free ends of the teeth 14 and the housing surface 6. This edge engagement may be at one or more points on the outer edge of each tooth, depending upon the form of the teeth, their angle with respect to the annular portion 13, and the form of the housing surface 6. Line contact of the teeth edges, or surface contact of the tooth end or outer faces, with the housing surface, is within the scope of this invention. The resilient tendency of the teeth 14 to return to their formed positions holds the ring 3 securely in place in the open end of the housing 1, with the frustum top defining surface of the annular portion 13 under pressure against the housing cover 2.

Figure 5:
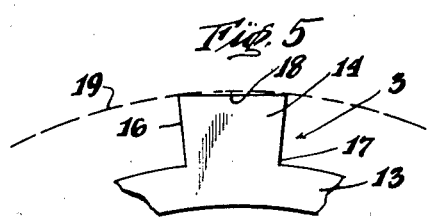
Figure 5 is an illustration of the form of a tooth portion of a housing cover securing ring of this invention.

Referring to Figure 5, it has been found that an effective formation for the spring ring teeth 14 is with their side edges 16 and 17 lying in radial planes with respect to the ring 3 and with their peripheral edges 18 forming chords of the arcs defined by the radial planes of side edges 16 and 17 with respect to the peripheral circle of the ring 3 about the free ends of the teeth 14 as indicated by the dotted line 19. This form provides the teeth 14 with acute angles between the side edges 16 and 17 and the end edge 18, and is particularly useful when the ring 3 is plated, as with nickel, cadmium, copper or other suitable material, to prevent corrosion.

Thus, the engagement between the teeth 14 and the housing wall 6 is primarily at the corners formed by tooth side edges 16 and 17 with the end edges 18, assuring more positive contact with the wall 6 and a tendency for the tooth corners to dig into the wall 6, and providing a very secure assembly.

In stead of the "chord" tooth described above, a "radius" tooth may be used if the ring 3 is made from a material which does not require plating. The "radius" tooth, if substituted in Figure 5, would have its outer peripheral edges lying along the circle 19.

Figure 4:
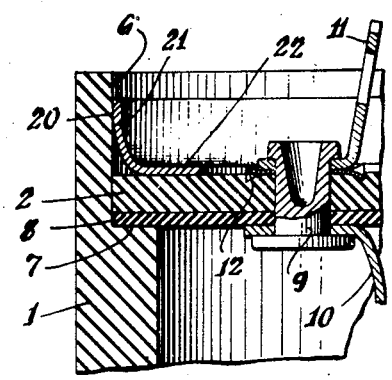
Figure 4 is a partial view, in central section, of an alternate structure of this invention.

The alternate structure assembly of Figure 4 is an assembly like that described above except that a solid spring ring 20, without the teeth shown in ring 3, is used to secure the cover 2 to the condenser housing 1. Ring 20 is formed by drawing and centrally perforating a shallow cup to provide the solid ring with a peripheral angle portion 21 and a plane surface annular portion 22. Like the spring ring 3, ring 20 is formed oversize with respect to the inner housing diameter defined by wall 6, and in assembly the angle portion 21 is forced inwardly and the ring is held in place with the annular portion 22 pressing the cover 2 against the housing shoulder 7 by the spring engagement of the angle portion 21 against the housing wall 6. This engagement may be made by a point, edge, or outer surface contact of the angle portion 21 with the housing surface 6, in similarity with the corresponding contacts made by the teeth of the ring 3.

The spring ring 20, like the spring ring 3, has the general form of a frustum of a cone, and is inserted in the condenser housing with the top down and the normal cone base facing outward.

This invention provides a simple and inexpensive condenser housing and cover combination, with the cover efficiently mechanically secured and hermetically sealed in the housing.

What is claimed is:

1. In an electrolytic condenser assembly, a cylindrical plastic housing with one end integrally closed and the other end open with an inner smooth surface having a straight longitudinal dimension extending inwardly to an annular shoulder; a cover disc of rigid insulating material with a disc of compressible material secured to its inner face, said cover disc being located in the open end of said housing in seating relation with said shoulder; and a spring-metal-cover-retaining closed ring also in the open end of said housing, said closed ring having a plane annular surface in holding engagement with said cover, and peripheral teeth angularly disposed with respect to said plane annular surface and in resilient but penetrating engagement with said inner surface of said housing.

2. In an electrical unit assembly, a cylindrical plastic housing having two distinct internal diameters and having an open end with a longitudinally straight and smooth internal wall surface, a shoulder formed in the open end of said housing by aligning said diameters in the same plane, a cover comprising an outer rigid member for receiving an electric terminal connection together with an inner resilient member for sealing said shoulder and said outer member, and a peripherally toothed cover retaining ring also in said opening, said ring having a portion in holding relation with said cover and an angularly formed portion comprising said toothed periphery, in resilient but penetrating engagement with the smooth walls of one of said surfaces in said housing, said electric terminal connection extending through the central portion of said ring, the outer pointed corners of each tooth engaging the inner smooth surface of said housing with a penetrating action, the outer surface of each tooth between said corners being spaced from the inner surface of said housing.

3. In an electrolytic condenser assembly, a cylindrical plastic housing with one end integrally closed and the other end open with an inner smooth surface having a straight longitudinal dimension extending inwardly to an annular shoulder, a cover disc of rigid insulating material, said cover disc being located in the open end of said housing in seating relation with said shoulder, and a spring-metal-cover-retaining closed ring also in the open end of said housing, said closed ring having a plane annular surface in holding engagement with said cover, and peripheral teeth angularly disposed with respect to said plane annular surface and in resilient but penetrating engagement with said inner surface of said housing.

GLENN W. CARPENTER.

REFERENCES CITED

The following references are of record in the file of this patent:

UNITED STATES PATENTS

| Number | Name | Date |
| --- | --- | --- |
| 212,064 | Spencer | Feb. 4, 1879 |
| 780,732 | Schmitt | Jan. 24, 1905 |
| 786,296 | Keller | Apr. 4, 1905 |
| 929,974 | McNutt | Aug. 3, 1909 |
| 1,123,733 | Grunwald | Jan. 5, 1915 |
| 2,202,166 | Peck | May 28, 1940 |
| 2,379,053 | Weingart | June 26, 1945 |